United States Patent
Mohamad et al.

(10) Patent No.: US 10,122,496 B2
(45) Date of Patent: *Nov. 6, 2018

(54) METHOD FOR DYNAMIC AND SELECTIVE FD-DSDF TRANSMISSION OF A DIGITAL SIGNAL FOR A MARC SYSTEM WITH A FULL-DUPLEX RELAY, AND CORRESPONDING PROGRAM PRODUCT AND RELAY DEVICE

(71) Applicant: Orange, Paris (FR)

(72) Inventors: Abdulaziz Mohamad, Fontenay aux Roses (FR); Raphaël Visoz, Vanves (FR); Antoine Berthet, Chatenay Malabry (FR)

(73) Assignee: ORANGE, Paris (FR)

( * ) Notice: Subject to any disclaimer, the term of this patent is extended or adjusted under 35 U.S.C. 154(b) by 119 days.

This patent is subject to a terminal disclaimer.

(21) Appl. No.: 15/321,712

(22) PCT Filed: Jun. 25, 2015

(86) PCT No.: PCT/FR2015/051728
§ 371 (c)(1),
(2) Date: Dec. 22, 2016

(87) PCT Pub. No.: WO2015/197990
PCT Pub. Date: Dec. 30, 2015

(65) Prior Publication Data
US 2017/0141879 A1    May 18, 2017

(30) Foreign Application Priority Data
Jun. 27, 2014  (FR) ..................... 14 56104

(51) Int. Cl.
*H04L 1/00*  (2006.01)
*H04B 7/155*  (2006.01)
(Continued)

(52) U.S. Cl.
CPC ....... *H04L 1/0076* (2013.01); *H04B 7/15592* (2013.01); *H04B 7/17* (2013.01); *H04L 5/14* (2013.01); *H04L 2001/0097* (2013.01)

(58) Field of Classification Search
CPC .... H04B 7/15592; H04B 7/17; H04B 7/0854; H04B 7/0857; H04L 1/0076;
(Continued)

(56) References Cited

U.S. PATENT DOCUMENTS

| | | | |
|---|---|---|---|
| 5,889,821 A | 3/1999 | Arnstein et al. | |
| 6,975,582 B1 | 12/2005 | Karabinis et al. | |

(Continued)

FOREIGN PATENT DOCUMENTS

| | | |
|---|---|---|
| WO | WO 2011/033237 | 3/2011 |
| WO | WO 2012/022905 | 2/2012 |

(Continued)

OTHER PUBLICATIONS

U.S. Office Action dated Jul. 17, 2017, in co-pending U.S. Appl. No. 15/321,706, filed Dec. 22, 2016.
(Continued)

*Primary Examiner* — Mewale Ambaye
(74) *Attorney, Agent, or Firm* — Knobbe, Martens, Olson & Bear, LLP (57) ABSTRACT

Some embodiments relate to a full-duplex relay for a telecommunications system comprising a plurality of sources, the relay, and a destination. The relay comprises a decoder which estimates for each source a code word $x_{S,t}$ encoding a K-bit message $u_{S,t}$, from received blocks corresponding to successive code words $x_{S,t}$ transmitted simultaneously by the sources during T time slots, such that at each time slot t, t=1, . . . , T, a code word $x_{S,t}$ comprises B blocks $x_{S,t}^{(1)}$, $x_{S,t}^{(2)}$, . . . , $x_{S,t}^{(B)}$ of which the first can be decoded independently of the other blocks. It also comprises a
(Continued)

decision component which enables the relay to detect messages that have been decoded without error and to take a decision and an encoder and transmitter which encode a signal and transmit it to the destination, which signal is representative only of messages that have been decoded without error. After each received block, the encoding and transmission unit is under the control of the decision component.

15 Claims, 6 Drawing Sheets

(51) Int. Cl.
*H04L 5/14* (2006.01)
*H04B 7/17* (2006.01)

(58) Field of Classification Search
CPC . H04L 2001/0097; H04L 5/14; H04L 25/242; H04L 25/03343; H04L 25/497; H04L 25/03057
See application file for complete search history.

(56) References Cited

U.S. PATENT DOCUMENTS

| | | | |
|---|---|---|---|
| 7,281,192 | B2 | 10/2007 | Shen et al. |
| 8,116,400 | B2 | 2/2012 | Limberg |
| 9,164,816 | B2 | 10/2015 | Auvray et al. |
| 9,197,480 | B2 | 11/2015 | Boucadair et al. |
| 9,225,752 | B2 | 12/2015 | Boucadair et al. |
| 9,319,187 | B2 | 4/2016 | Hatefi et al. |
| 2013/0022088 | A1 | 1/2013 | Hatefi et al. |
| 2013/0250776 | A1 | 9/2013 | Hatefi et al. |
| 2014/0056334 | A1 | 2/2014 | Khina et al. |
| 2015/0124694 | A1 | 5/2015 | Benammar et al. |
| 2017/0155472 | A1 | 6/2017 | Mohamad et al. |

FOREIGN PATENT DOCUMENTS

| | | |
|---|---|---|
| WO | WO 2013/093359 A1 | 7/2013 |
| WO | WO 2015/197991 A1 | 12/2015 |

OTHER PUBLICATIONS

Agustin et al. 2009. ICT-215282 STP Rocket. Retrieved from the Internet on Nov. 16, 2011: URL:http://www.ict-rocket.eu/documents/Deliverables/ROCKET/3D1UPCi.pdf, 194 pages.
Dubois-Ferrière et al. Jan. 1, 2005. Packet Combining in Sensor Networks. *Proceedings of the 3rd International Conference on Embedded Networked Sensor Systems*, SenSys '05, 14 pages.
Hatefi et al. Jul. 25, 2011. Full Diversity Distributed Coding for the Multiple Access Half-Duplex Relay Channel. *2011 International Symposium on Network Coding (NETCOD)*, 6 pages.
Hu et al. Sep. 1, 2007. Low Density Parity Check Codes Over Wireless Relay Channels. *IEEE Transactions on Wireless Communications*, 6(9):3384-3394.
Kramer et al. 2005. Cooperative Strategies and Capacity Theorems for Relay Networks. *IEEE Transactions on Information Theory, IEEE Press*, 51(9):3037-3063.
Plainchault et al. Dec. 5, 2011. Interference Relay Channel with Precoded Dynamic Decode and Forward Protocols. *Global Telecommunications Conference (GLOBECOM 2011), IEEE*, 6 pages.
International Search Report dated Oct. 12, 2015 for International Application No. PCT/FR2015/051728 filed Jun. 25, 2015, 9 pages.
Written Opinion dated Oct. 12, 2015 for International Application No. PCT/FR2015/051728 filed Jun. 25, 2015, 8 pages.
French Search Report dated Mar. 27, 2015 for French Application No. FR 1456104 filed Jun. 27, 2014, 12 pages.
International Search Report and Written Opinion dated Oct. 13, 2015 for International Application No. PCT/FR2015/051729 filed Jun. 25, 2015, 13 pages.
French Search Report dated Mar. 25, 2015 for French Application No. FR 1456103 filed Jun. 27, 2014, 11 pages.
English Translation of International Application No. PCT/FR2015/051729 filed Jun. 25, 2015 (published on Dec. 30, 2015 as WO 2015/197991 A1), 39 pages.
English Translation of Written Opinion dated Dec. 27, 2016 for International Application No. PCT/FR2015/051728, filed Jun. 25, 2015.
Kschischang et al., "Factor graphs and the sum-product algorithm", Prepublication Avail. Online Jul. 27, 1998—76 pages.
Kschischang et al., "Factor graphs and the sum-product algorithm", IEEE Trans Inform Theory., (2001) IT-47(2): 498-519.
U.S. Specification and Abstract (English Translation) as filed in U.S. Appl. No. 15/321,706 dated Dec. 22, 2016 (39 pages).
U.S. Preliminary Amendment as filed in U.S. Appl. No. 15/321,706 dated Dec. 22, 2016 (11 pages).

METHOD FOR DYNAMIC AND SELECTIVE FD-DSDF TRANSMISSION OF A DIGITAL SIGNAL FOR A MARC SYSTEM WITH A FULL-DUPLEX RELAY, AND CORRESPONDING PROGRAM PRODUCT AND RELAY DEVICE

RELATED APPLICATIONS

This application is the U.S. National Phase of Application No. PCT/FR2015/051728 entitled "METHOD FOR DYNAMIC AND SELECTIVE FD-DSDF TRANSMISSION OF A DIGITAL SIGNAL FOR A MARC SYSTEM WITH A FULL-DUPLEX RELAY, A CORRESPONDING PROGRAM PRODUCT AND RELAY DEVICE" filed Jun. 25, 2015, which designated the United States, and which claims the benefit of French Application No. 1456104 filed Jun. 27, 2014.

FIELD OF THE INVENTION

In general manner, the present invention relates to the field of digital communications. More precisely, the field of the invention is that of transmitting coded data in a multiple-access relay channel (MARC) network. A MARC network is a telecommunications system that, for a given destination, comprises at least three nodes: at least two transmitters and a relay. More precisely, the invention relates to relaying, and it seeks to improve the quality of data transmission, and in particular to improve the performance of error-correcting decoding in a (destination) receiver. The relaying is performed by a relay that co-operates with the sources in order to obtain communication that is more reliable between the sources and the destination.

The invention relates particularly, but not exclusively, to transmitting data via mobile networks, e.g. for real-time applications. It applies more particularly to so-called "full-duplex" (FD) relays with links between the nodes that may equally well be non-orthogonal (with interference), semi-orthogonal (with some interference), or orthogonal (with no interference). In this application, a link is a communication channel between two or more nodes, and it may be physical or logical. When the link is physical, it is generally referred to as a channel.

PRIOR ART

Networks, and in particular mobile networks, are looking for significant improvements in terms of capacity, reliability, consumption, etc. The transmission channel of a mobile network has the reputation of being difficult, and leads to transmission reliability that is relatively poor. Over the last few years, considerable progress has been achieved in terms of encoding and modulation, in particular concerning consumption and capacity. Specifically, in a mobile network where a plurality of transmitters/receivers share the same resources (time, frequency, and space) it is necessary to reduce transmission power as much as possible.

Such reduction goes against the coverage, and thus against the capacity, of the system, and more generally against its performance.

Figure 1:
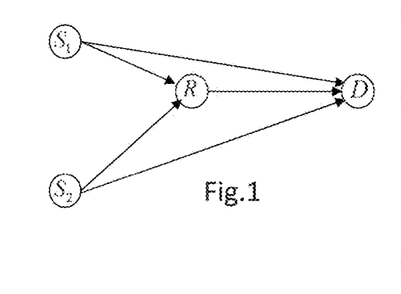
FIG. 1 is a diagram showing the basic topology of MARC systems.

In order to increase coverage, to make communication more reliable, and more generally to improve performance, one approach consists in relying on relays for increasing spectrum efficiency (coding gain) and thus improving the transmission efficiency and the reliability of systems (diversity gain). The basic topology of MARC systems as shown in FIG. 1 is such that the resources, nodes $S_1$ and $S_2$, broadcast their coded information sequences for the attention of the relay R and of the destination D. The relay decodes the signals received from the sources $S_1$ and $S_2$ and it re-encodes these jointly while adding its own redundancy so as to create a spatially-distributed network code as seen from the receiver D. At the destination D, the decoding of the three spatially-distributed coded sequences, comprising the two coded sequences received directly from the sources $S_1$ and $S_2$ together with the coded sequence coming from the relay, relies on joint channel and network decoding algorithms.

Network coding is a form of cooperation in which the nodes of the network share not only their own resources (power, bandwidth, etc.) but also their computation capacity, in order to create a distributed code that becomes more and more powerful as the information propagates through the nodes. It gives rise to substantial improvement in terms of diversity and of encoding, and thus in terms of transmission reliability.

A distinction is made between two types of operation for the relay: half-duplex mode and full-duplex mode. The invention applies to full-duplex relays.

In full-duplex mode, the relay receives new information blocks from both sources and simultaneously transmits to the destination information based on the previously received blocks; the relay can thus receive and transmit simultaneously on the same frequency band or on different bands. In comparison with a half-duplex relay, a full-duplex relay makes it possible to achieve greater capacity.

Figure 2:
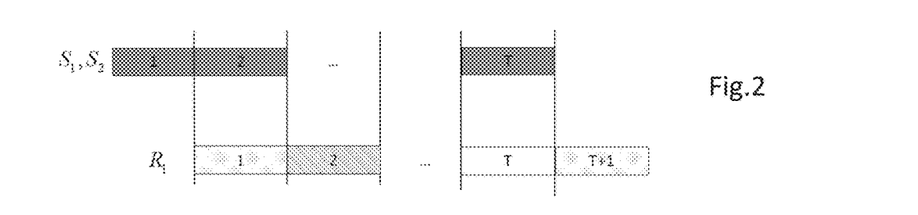
FIG. 2 is a diagram showing a prior art cooperation protocol in which the sources transmit during T time slots, and the relay co-operates after the end of each time slot, thereby leading to cooperation that requires T+1 time slots.

Patent application WO 2011/033237 relates to a MARC system with a full-duplex relay implementing a transmission protocol of the Markov chain type. In that protocol, the destination observes block-coded information coming from the two sources $S_1$, $S_2$ superposed on the preceding block-coded information coming from the relay. Thereafter, the processing on reception needs to make joint use of a plurality of successive blocks. In the protocol used, as shown in FIG. 2, each source has T K-bit messages for transmitting during a time slot t, $t \in \{1, \ldots, T\}$. At the end of each time slot t, where $t \in \{1, \ldots, T\}$ the relay $R_1$ attempts to decode the messages from the sources and to transmit the result of a deterministic function of the decoded messages during the time slot t+1. The protocol thus requires T+1 time slots in order to transmit the T messages. The destination attempts to decode the messages from the sources at the end of time slot T+1 by using the signals transmitted throughout the period of the T+1 time slots. Such a protocol is complex to implement when the relays perform decoding of flexible type with log likelihood ratios (LLRs) being transmitted to the destination.

Patent application WO 2012/022905 relates to a MARC system implementing a relaying protocol that does not transmit words that have been decoded erroneously by using a "selective decode and forward" (SDF) technique. Error detection in the relay is based on verifying a cyclic redundancy check (CRC) included in each source message. That protocol serves to reduce the complexity of decoding at the destination and at the relay, while conserving high capacity when the protocol is implemented with a full-duplex (FD) relay. With reference to FIG. 2, if the relay has correctly decoded the sources at the end of the time slot t, then during the time slot t+1 it transmits a payload signal to help both sources. If only one source is correctly decoded, then the signal is representative of that source only. If neither source is correctly decoded, then the relay remains silent.

MAIN CHARACTERISTICS OF THE INVENTION

The invention relates to transmitting a digital signal in a network having at least four nodes comprising two transmitters, a relay, and a destination, the method enabling transmission capacity to be optimized when the relay is a full-duplex relay, which is thus capable of receiving and transmitting simultaneously, while limiting the complexity of decoding at the relay and at the destination.

The invention provides a relaying method implemented by the full-duplex relay for a telecommunications system comprising a plurality of sources, the relay, and a destination. The method comprises:

- a decoding step for estimating for each source a code word $x_{S,t}$ from received blocks corresponding to successive code words $x_{S,t}$ transmitted simultaneously by the sources during T time slots, such that, at each time slot t, t=1, . . . , T, a code word $x_{S,t}$ comprises B blocks $x_{S,t}^{(1)}$, $x_{S,t}^{(2)}$, . . . , $x_{S,t}^{(B)}$ of which the first can be decoded independently of the other blocks, a code word $x_{S,t}$ encoding a K-bit message $u_{S,t}$;
- a step of the relay detecting messages that have been decoded without error and taking a decision; and
- a step of encoding a signal and of transmitting it to the destination, which signal is representative only of messages that have been decoded without error.

The method is such that, after each received block, the encoding and transmission are under the control of the step of detecting messages that have been decoded without error and of taking a decision in compliance with a selection scheme.

The invention also provides a full-duplex relay for a telecommunications system comprising a plurality of sources, the relay, and a destination. The relay comprises:

- a decoding unit for estimating for each source a code word $x_{S,t}$ from received blocks corresponding to successive code words transmitted simultaneously by the sources during T time slots, such that, at each time slot t, t=1, . . . , T, a code word $x_{S,t}$ comprises B blocks $x_{S,t}^{(1)}$, $x_{S,t}^{(2)}$, . . . , $x_{S,t}^{(B)}$ of which the first can be decoded independently of the other blocks, a code word $x_{S,t}$ encoding a K-bit message $u_{S,t}$;
- a decision unit enabling the relay to detect messages that have been decoded without error and to take a decision; and
- an encoding and transmission unit for encoding a signal and for transmitting it to the destination, which signal is representative only of messages that have been decoded without error.

After each received block, the encoding and transmission unit is under the control of the unit for detecting errors and for taking a decision in compliance with a selection scheme.

Thus, the relay forms part of a MARC system that has at least two sources (transmitters) and the destination. The MARC system may have more than two transmitters (sources). The transmitters transmit simultaneously to the same receiver (destination), thus enabling maximum use to be made of the common spectrum resource.

The transmission by the sources may take place simultaneously over the same radio resource (time and frequency), which makes it possible to maximize use of the common spectrum resource; the source-relay links are then not orthogonal. There is thus interference between the signals received by the relay and by the destination as a result of the source signals being superposed during transmission, firstly between the sources and the relay and secondly between the sources and the destination (the receiver).

In an embodiment, the sources transmit simultaneously over the same radio resource, and the decoding step at the relay is iterative and comprises joint detection and joint decoding. The joint detection and decoding in the relay make it possible to separate the streams transmitted simultaneously by the transmitters.

When the sources transmit simultaneously but over different spectrum resources, the relay does not need the iterative joint detection and decoding step. Under such circumstances, the relay can decode the messages from the sources on the basis of sequences received without interference between the sources. Under such circumstances, the source-relay links are orthogonal.

The relay may optionally receive and transmit on different frequency bands. Such band separation is more particularly advantageous for a MARC system having only one relay. Such a configuration makes it possible to use a receive antenna that is dedicated and it serves above all to simplify processing on reception by limiting disturbances due to the relay transmitting simultaneously in the same band.

The use of encoding at the source (transmitters) whereby the first block can be decoded independently of the other blocks avoids the need for an additional time slot; T messages are transmitted for each transmitter in T time slots. The encoding at the source may be encoding of the finite incremental redundancy type.

The encoding at the relay, which includes network coding and channel coding, enables all of the dispersed transmitters to benefit from the coding gain of a spatially distributed network code without decreasing spectrum efficiency. This makes it possible in the receiver to implement iterative decoding that relies on redundancy generated in the relay without requiring power to be increased in the transmitters in order to achieve an increase in the coverage of the system and in spectrum efficiency.

By not transmitting the messages that are detected with error, the transmission protocol avoids any propagation of transmission errors as introduced more particularly when the links from the transmitters to the relay are not very reliable. Interleaving messages that have been detected without error is a known technique that is necessary for achieving joint channel decoding at the destination of the signals from the transmitters and of the signal from the relay.

The protocol contributes to reducing energy consumption by combating error propagation and by effectively combating interference (when it is cooperating, the relay always transmits payload information).

The protocol makes it possible to reach a maximum data rate by controlling the encoding and the transmission without waiting for the messages from all of the transmitters to be decoded without error and without waiting for the end of the time slot or without waiting for the last time slot. Thus, during a time slot, the relay transmits redundancy relating to a message that has been decoded without error during the same time slot. As a result, additional redundancy is transmitted almost immediately to the destination, which redundancy is determined by the relay, even while the relay continues to decode messages coming from the other transmitters, which is not possible with a relay of the half-duplex type. The protocol gives particularly good performance since by making full use of the ability of a full-duplex relay to receive and transmit simultaneously, it does not require a threshold concerning a number of time slots in order to decide whether to switch between detecting messages and encoding messages that have been detected without error.

When the various messages transmitted by the transmitters are mutually independent, the protocol avoids introducing pointless latency in the processing on reception of these messages, as can happen in the prior art by waiting for the end of the time slot T+1 before attempting to decode all of the messages, or by the relay waiting for a certain number of time slots to elapse before switching to encoding. Instead of being silent during a time slot $t \in \{2, \ldots, T\}$ in the absence of any message that has been decoded without error at the end of timeslot t−1, the relay can provide help for any message that has been decoded without error previously, i.e. during the time slots $1, \ldots, t-1$. The transmission protocol of the invention thus ensures full use is made of the full-duplex capabilities of a relay, and leads to optimized transmission capacity.

The relays may equally well be stationary relays or mobile relays. Given the density of communications to be transmitted in densely populated zones, the number of relays may be large, and much greater than two. Specifically, in order to cover such zones, stationary relays may be used in preference to base stations, which are of a cost that can be considerably greater. Alternatively, it is possible to use mobile relays. Such mobile relays are typically mobile terminals.

In an embodiment, messages that have been decoded without error are detected by means of a CRC type code included in each K-bit message $u_{S,t}$.

In an embodiment, the messages that have been decoded without error are stored.

By storing the messages that have been decoded without error, a relay can make use several times over of the same message that has been decoded without error, i.e. it can use it during a plurality of time slots, in order to generate the signal going to the destination.

In an embodiment, in the absence of a message that has been decoded without error during a current time slot t, the error detection and decision taking step allows a message that has been decoded without error during a preceding time slot to be encoded and transmitted.

Thus, instead of being silent during the time slots following the current time slot t while waiting to decode correctly the message from another source, the relay can continue to transmit the redundancy determined on the message from the source that has been decoded without error during an earlier time slot $1, \ldots, t-1$.

In an embodiment, the decision taken allows a message to be encoded and transmitted as soon as it has been decoded without error.

Thus, the relay of the invention transmits redundancy to the destination without delay, i.e. without waiting for the end of the time slot, which redundancy relates to the source that has been decoded without error, thus providing help to the destination in decoding the same source. This gain provided for one source can be beneficial to the other sources. Specifically, by releasing decoding means both in the relay and in the destination in order to concentrate on the sources that have not yet been decoded correctly, the protocol increases the probability of decoding all of the sources without error.

In an implementation, after each received block, detection and decoding are under the control of the step of detecting messages that have been decoded without error and of taking a decision in compliance with a selection scheme.

In this implementation, detection and decoding may be adapted as a function of error detection.

In an implementation, if all the messages are decoded without error during a current time slot t, then the step of detecting messages that have been decoded without error and of taking decisions stops detection and decoding until the end of the current time slot and allows encoding and transmission.

More particularly, this implementation makes it possible to emphasise the reduction in energy consumption by avoiding any pointless expenditure of the detection and decoding means. It also makes it possible to concentrate the energy of the relay on other means.

In an implementation, the selection scheme is such that, at each current time slot t, the transmitted signal is representative of the messages decoded without error up to the current time slot t.

Thus, the destination can benefit from a plurality of different redundancies for a single message correctly decoded by the relay. The destination making use of these various occurrences contributes to increasing the probability of correctly decoding the received messages.

In an implementation, the selection scheme is such that, during each current time slot t, the transmitted signal is representative of the messages that have been decoded without error solely during the current time slot t.

This implementation has the advantage of being simple since it requires little signalling.

In an implementation, the encoding and transmission step includes interleaving for each source for which a message has been decoded without error prior to network coding.

Interleaving at the input to network coding makes it possible for the destination to have a structure similar to parallel concatenation (similar to a distributed turbo-code). As a function of the way the network coding is decoded at the destination, the interleaving may optionally be different among the sources.

In an implementation, the encoding and transmission step comprises network coding followed by first interleaving, by channel coding, and by second interleaving distinct from the first.

The second interleaving makes it possible to give a certain signature to the signal transmitted by the relay, thus making it possible to distinguish it from the signals transmitted simultaneously by the transmitters. After separating the signal transmitted by the relay, the first interleaving, which may optionally be variable as a function of the block, makes it possible to distinguish (in the statistical independence meaning) between network coding and channel coding.

In an embodiment, the full-duplex relay further comprises a unit for storing the messages that have been decoded without error.

In an embodiment, the full-duplex relay is such that, after each received block, the decoding unit is under the control of the unit for detecting errors and for taking a decision in compliance with a selection scheme.

In an embodiment, the full-duplex relay is such that the encoding and transmission unit includes one interleaver per source for which a message has been decoded without error at the input of a network code.

In an embodiment, the full-duplex relay is such that the encoding and transmission unit includes a network code followed by a first interleaver, by a channel encoder, and by a second interleaver distinct from the first.

The advantages of the full-duplex relay are the same as the advantages of the relaying method. Consequently, they are not described in detail.

The invention also provides a MARC system in which the relay is a full-duplex relay of the invention.

The invention also provides a reception method for a receiver of at least one MARC system for performing a relaying method of the invention. The reception method comprises:

joint detection and decoding of blocks coming from the sources and of messages coming from the relay, the detection and decoding being performed iteratively at the end of each time slot t such that $t \in \{Q, \ldots, T\}$ over the duration of a sliding window of length $Q$, $Q \in \{1, \ldots, T\}$, with propagation of probabilities between the iterations in order to estimate Q messages for each source.

The reception method is such that the decoding of messages from the relay is configured at each sub slot in compliance with signalling information coming from the relay indicating whether the relay is cooperating on this block b, b=1, . . . B, and such that probability propagation is configured at each block b, b=1, . . . B, in compliance with signalling information coming from the relay indicating the selection scheme of the relay.

The invention also provides a receiver for at least one MARC system for performing a relaying method of the invention. The receiver comprises:

a detection and decoding unit for joint detection and decoding of blocks coming from the sources and of messages coming from the relay, the detection and decoding being performed iteratively at the end of each time slot t such that $t \in \{Q, \ldots, T\}$ over the duration of a sliding window of length $Q$, $Q \in \{1, \ldots, T\}$, with propagation of probabilities between the iterations in order to estimate Q messages for each source.

The receiver is such that the decoding of messages from the relay is configured at each sub slot in compliance with signalling information coming from the relay indicating whether the relay is cooperating on this block b, b=1, . . . B, and such that probability propagation is configured at each block b, b=1, . . . B, in compliance with signalling information coming from the relay indicating the selection scheme of the relay.

The invention also provides a method of transmitting a digital signal for a telecommunications system comprising a plurality of sources ($\{S_1, S_2, \ldots, S_M\}$), the relay, and a destination implementing a spatially distributed network code, the method comprising for each source:

a step of encoding messages $u_{S,t}$ including respective CRCs into code words $c_{s,t}$; and a step of transmitting the code words $c_{s,t}$ during T time slots to the relay and to the destination.

The transmission method is such that the encoding is of finite incremental redundancy type and, at each sub slot b=1, 2, . . . , B of a time slot, it delivers a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks, and such that the following blocks are parity bits that add redundancy to the first block.

The invention also provides a transmitter for transmitting a digital signal for a telecommunications system comprising a plurality of sources, the relay, and a destination implementing a spatially distributed network code, comprising for each transmitter:

an encoder for encoding messages $u_{S,t}$ having respective CRCs into code words $c_{s,t}$; and a transmitter for transmitting the code words $c_{s,t}$ during T time slots to the relay and to the destination.

The transmitter is such that the encoder is of finite incremental redundancy type and, at each sub slot b=1, 2, . . . , B of a time slot, it delivers a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks, and such that the following blocks are parity bits that add redundancy to the first block.

In a preferred implementation, the steps of the relaying method are determined by instructions of a relaying program incorporated in one or more electronic circuits such as chips, which themselves may be arranged in electronic devices of the MARC system. The relaying method of the invention may equally well be performed when the program is loaded into a calculation member such as a processor or the equivalent with its operation then being controlled by executing the program.

Consequently, the invention also applies to a computer program, in particular a computer program on or in a data medium, and suitable for performing the invention. The program may use any programming language, and it may be in the form of source code, object code, or code intermediate between source code and object code, such as in a partially compiled form, or in any other desirable form for implementing a method of the invention.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk, or universal serial bus (USB) stick.

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

The invention thus also provides a computer program on a data medium, said program including program instructions adapted to performing a method of relaying a digital signal of the invention, when said program is loaded and executed in a relay for a MARC system for performing the relaying method.

The invention also provides a data medium including program instructions adapted to performing a method of relaying a digital signal of the invention, when said program is loaded and executed in a relay for a MARC system for performing the relaying method.

LIST OF FIGURES

Other characteristics and advantages of the invention appear more clearly on reading the following description of implementations given merely as illustrative and nonlimiting examples, and from the accompanying drawings, in which.

DETAILED DESCRIPTION OF PARTICULAR EMBODIMENTS

Figure 3:
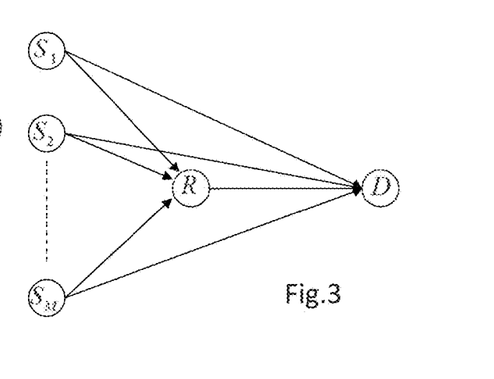
FIG. 3 is a diagram showing the topology of a MARC system having N transmitters, one relay, and one destination.

The context of the invention is that where a plurality of sources (transmitters) $S_1, \ldots, S_M$ seek to send their respective messages to a common destination D using a full-duplex relay R, as shown in FIG. 3.

There is no constraint on the transmission channel; it may be subject to fast or slow fading, it may be frequency selective, and it may be a multiple-input and multiple-output (MIMO) channel. In the description below, the nodes (sources, relays, and destination) are assumed to be accurately synchronised, and the sources are independent (there is no correlation between them).

A transmission cycle is made up of T time slots. The duration of a cycle depends on the settings of the MARC system and in particular on the MAC layer of the seven-layer OSI model. At each time slot, each source has a K-bit message for transmitting. CRC type information forms part of the K-bit message transmitted by a source, and it is used to determine whether a received message is decoded correctly. The T messages from a source may be independent of one another or they may be correlated and constitute a frame.

The sources transmit simultaneously. The relay attempts to transmit a payload signal to the destination, which signal is representative of estimated messages in order to provide help in communication between the sources and the destination.

$F_2$ is the two element Galois field, R is the real number field and C is the complex number field.

Figure 4:
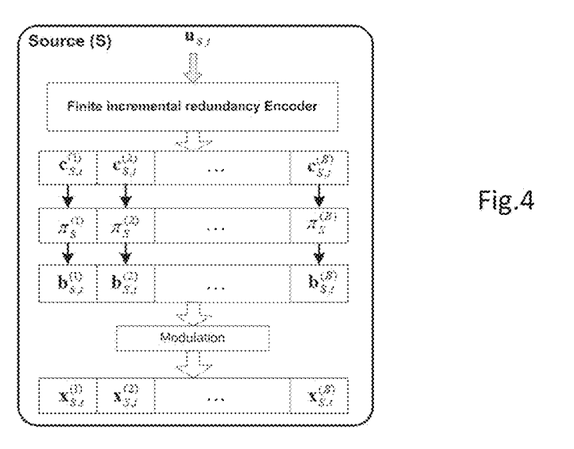
FIG. 4 is a diagram of an implementation of the processing implemented by a source of the invention.

The transmission scheme at the sources is shown in FIG. 4.

At each time slot $t, t=1, \ldots, T$, each source S from among the M sources $\{S_1, S_2, \ldots, S_M\}$ has a message $u_{S,t}$ made up of K bits of information for transmission, $u_{S,t} \in F_2^K$. The message $u_{S,t}$ includes a CRC type code that makes it possible to verify the integrity of the message $u_{S,t}$.

The statistically independent sources $\{S_1, S_2, \ldots, S_M\}$ perform encoding of the message $u_{S,t}$ by means of an incremental redundancy code and they transform the message $u_{S,t}$ into $n_S$ bits written $c_{S,t} \in F_2^{n_S}$. The resulting code word $c_{S,t}$ is segmented into B redundancy blocks, each of which is transmitted during a sub slot, written $c_{S,t}^{(b)} \in F_2^{n_{S,b}}$ with $b=1, 2, \ldots, B$. Each block comprises $n_{S,b}$ bits, with $$n_S = \sum_{b=1}^{B} n_{S,b}.$$

The incremental redundancy code may be of the systematic type, in which case the information bits are included in the first block: $u_{S,t} \in c_{S,t}^{(1)}$. Regardless of whether or not the incremental redundancy code is of the systematic type, it is such that the first block $c_{S,t}^{(1)}$ from among of the B blocks can be decoded independently of the other blocks. The highest coding rate at the source S is $K/n_{S,1}$ and it cannot be greater than one, $n_{S,1} > K$. The minimum coding rate for a source S is $K/n_S$. Each block $\{c_{S,t}^{(b)}: 1 < b \leq B\}$ after the first block includes parity bits that add redundancy to the first block, each of the blocks $\{c_{S,t}^{(b)}: 1 < b \leq B\}$ being capable of being decoded jointly with the first block.

By way of example, the incremental redundancy code can be provided in practice by means of a finite family of punctured linear codes with compatible coding rates or of codes without coding rates that have been modified to operate with finite lengths: raptor code (RC), rate compatible punctured turbo code (RCPTC), rate compatible punctured convolutional code (RCPCC), rate compatible low density check code (LDPC).

Each block $c_{S,t}^{(b)}$ is interleaved by a distinct interleaver written $\pi_S^{(b)}$, the code word after interleaving being written $b_{S,t} = [b_{S,t}^{(1)}, b_{S,t}^{(2)}, \ldots b_{S,t}^{(B)}]$. The interleavers serve to combat fading, which may occur during transmission via the channel, and to give each source a fingerprint that makes the sources easier to separate by the relay and by the destination. Each interleaved portion $b_{S,t}^{(b)}$ of the code word is modulated in order to obtain a complex code word $x_{S,t} = [x_{S,t}^{(1)}, x_{S,t}^{(2)}, \ldots, x_{S,t}^{(B)}]$ with $x_{S,t}^{(b)} \in X^{N_b}$, $b=1, 2, \ldots, B$, where $X \subset C$ designates a complex signal of cardinal number $|X| = 2^{q_s}$ and where $N_b = n_{S,b}/q_S$.

Each source S from among the M sources $\{S_1, S_2, \ldots, S_M\}$ may use a minimum coding rate $K/n_S$ and a modulation order $q_s$ that are different from those of the other sources, in so far as the sub slots of the transmitted complex code words are identical between the sources: $n_{S,b}/q_S = N_b$, $b=1, 2, \ldots, B$.

Each source S transmits the code word $x_{S,t} = [x_{S,t}^{(1)}, x_{S,t}^{(2)}, \ldots, x_{S,t}^{(B)}]$ made up of B blocks during a time slot that is subdivided into B sub slots. Whatever the value of b, $1 \leq b \leq B$, the concatenation (or accumulation) of the blocks 1 to b is itself a code word since it comes from the incremental redundancy encoder.

In order to simplify reception structure at the relay and at the destination, the sources described have interleavers, an encoder, and a modulator that do not vary as a function of the time slot $t$, $t=1, \ldots, T$, but it would be equally possible for them to be variable.

The invention proposes a novel approach for the cooperation of a relay of a MARC system in order to give help to the sources that transmit, thereby obtaining an improvement in the spectrum efficiency of the transmission while enabling the encoding to be simple and effective in the receiver of the destination.

A relaying method of the invention is implemented by the at least one full-duplex relay for a MARC system.

Figure 5:
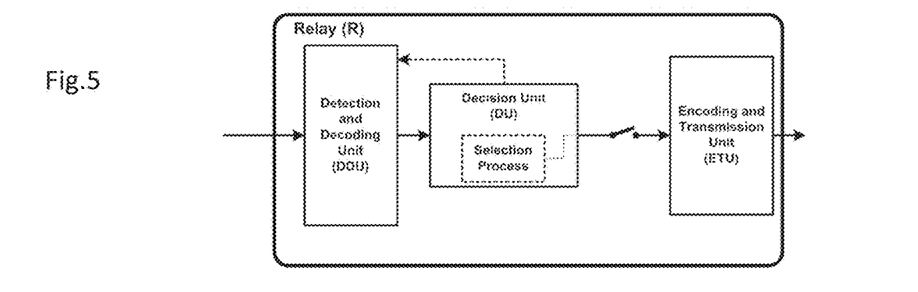
FIG. 5 is a diagram of an embodiment of a relay of the invention.

This relay R of the invention is shown in FIG. 5. The relay comprises an iterative detection and decoding unit DDU followed by a decision unit DU and by an encoding and transmission unit ETU. The detection and decoding unit DDU periodically delivers an estimated version of the decoded messages from the sources. The decision unit DU tests the CRCs of the estimated messages supplied by the DDU in order to determine which messages have been decoded without error, and it decides whether the relay is to transmit and what information it should transmit in each sub slot during the T time slots. The encoding and transmission unit ETU transmits the payload signal to the destination during the cooperation stage of the relay. The information to be included in the signal is selected by the decision unit DU.

Figures 6, 9:
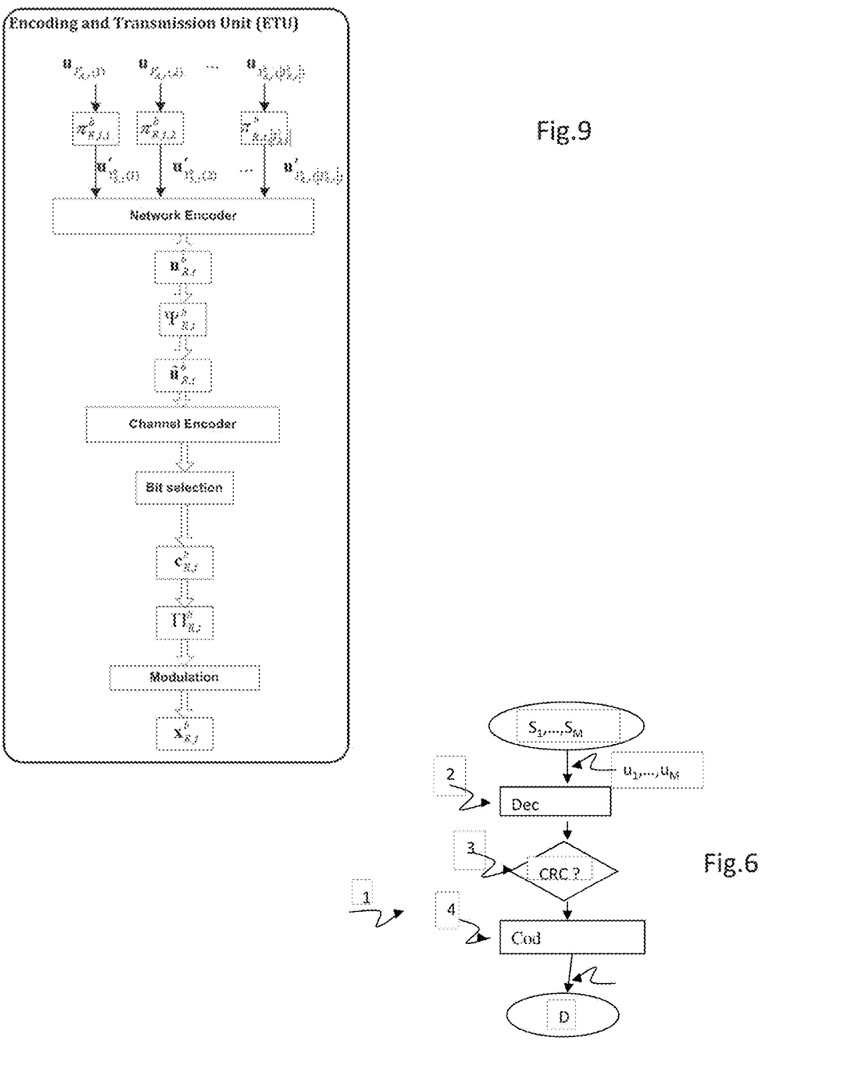
FIG. 6 is a flowchart of the method of the invention implemented by the relay R.
FIG. 9 is a diagram of an embodiment of the encoding and transmission unit (ETU) of a relay of the invention.

A flowchart of the method performed by the relay R is shown in FIG. 6. The method 1 comprises a decoding step 2, an error detection and decision step 3, and an encoding and transmission step 4 for sending a signal to the destination that is representative only of messages that have been decoded without error. The error detection and decision step controls encoding and transmission and feeds the encoding in compliance with a selection scheme after each received block. In an implementation, the error detection and decision step also controls decoding.

The decoding step 2 is performed by the detection and decoding unit DDU of the relay. This detection and decoding step supplies an estimate of the messages on the basis of the received words corresponding to the words $x_{S,t}=[x_{S,t}^{(1)}, x_{S,t}^{(2)}, \ldots, x_{S,t}^{(B)}]$ transmitted by each source S from among the M sources $\{S_1, S_2, \ldots, S_M\}$.

Figure 7:
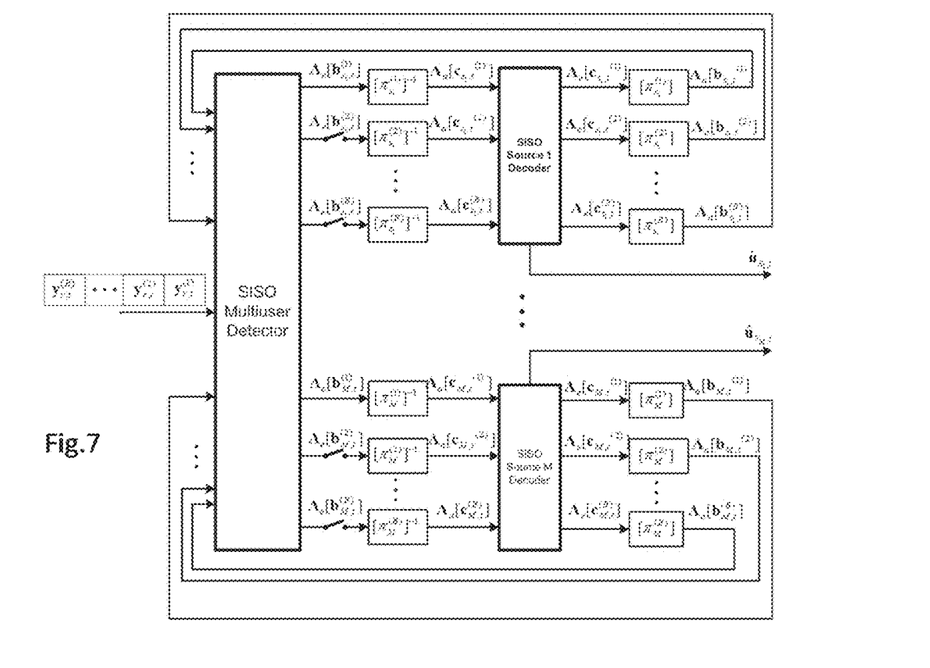
FIG. 7 is a diagram of an embodiment of the detection and decoding unit (DDU) of a relay of the invention.

In the event of simultaneous transmission over the same radio resource, the relay performs detection and decoding in joint and iterative manner. The structure of the detection and decoding unit DDU is shown in FIG. 7 and in simplified form for the source in FIG. 8. The unit DDU is of iterative structure constituted by a soft-in soft-out multiuser detector (SISO MUD) followed by as many soft channel decoders in parallel as there are sources $\{S_1, S_2, \ldots, S_M\}$. For a block b, $b \in \{1, 2, \ldots, B\}$, received during the time slot t, t=1, ..., T, the received sequence is expressed in the following form:

$$y_{R,t}^{(b)} = \sum_{i=1}^{M} h_{S_i,R,t} x_{S_i,t}^{(b)} + n_{R,t}^{(b)}$$

where $h_{S_i,R,t} \in \mathbb{C}$ represents the channel gain between the source $S_i$ and the relay R and where $n_{R,t}^{(b)} \in \mathbb{C}^{N_b}$ represents additive Gaussian noise. The DDU uses the current block b $y_{R,t}^{(b)}$ and all of the previously received blocks $y_{R,t}^{(1)}, y_{R,t}^{(2)}, \ldots, y_{R,t}^{(b-1)}$ in order to obtain an estimate of the messages $\hat{u}_{S_1,t}, \hat{u}_{S_2,t}, \ldots, \hat{u}_{S_M,t}$ from the sources.

At the end of receiving the first block, at each iteration, the multiuser detector MUD calculates in the form of a log likelihood ratio (LLR) the a posteriori probability (APP) of each interleaved and coded bit from each source S:

$$LAPPR: \Lambda([b_{S,t}^{(1)}]_k) \cong \log\left(\frac{Pr([b_{S,t}^{(1)}]_k = 1 \mid y_{R,t}^{(1)})}{Pr([b_{S,t}^{(1)}]_k = 0 \mid y_{R,t}^{(1)})}\right) k = 1, 2, \ldots, n_{S,1}$$

in which expression $n_{S,1}$ is the number of bits transmitted by each source S in the first block. This LAPPR may be written in the following form:

$$\Lambda([b_{S,t}^{(1)}]_k) = \Lambda_a([b_{S,t}^{(1)}]_k) + \Lambda_e([b_{S,t}^{(1)}]_k)$$

in which expression $\Lambda_a([b_{S,t}^{(1)}]_k)$ is the logarithm of the a priori probability ratio (LAPR) supplied by the SISO channel decoder of each source S at the preceding iteration, and $\Lambda_e([b_{S,t}^{(1)}]_k)$ is the extrinsic information associated with the bit $[b_{S,t}^{(1)}]_k$.

The vector $\Lambda_e([b_{S,t}^{(1)}]_k)$ is deinterleaved by a deinterleaver $[\pi_S^{(1)}]^{-1}$, and the output $\Lambda_a([c_{S,t}^{(1)}]_k)$ is the logarithm of the a priori probability ratio of the first block. The SISO channel decoder of the source S uses $\Lambda_a([c_{S,t}^{(1)}]_k)$ to provide a decoded version $\hat{u}_{S,t}$ of the message $u_{S,t}$ to the DU and to provide extrinsic information $\Lambda_e[c_{S,t}^{(1)}]$ of the bits. The vector of this extrinsic information is interleaved by the interleaver $\pi_S^{(1)}$. The output $\Lambda_a[b_{S,t}^{(1)}]$ from the interleaver (after SISO decoding the source 1) is looped back to the input of the SISO multiuser detector $MUD_t^{(b)}$ and marks the end of an iteration.

The iterations of the DDU come to an end, either because they have reached a maximum number of iterations, or else under the control of the error detection and decision step. For example, the error detection and decision step does not allow any further detection and decoding if all of the sources have been detected without error before the end of the time slot.

At the end of receiving a new block b, the switches corresponding to this block b and to all of the preceding blocks are switched. The procedure described for the first block is repeated, but taking into consideration $\underline{b}_{S,t}^{(b)}=[(b_{S,t}^{(1)}, b_{S,t}^{(2)}, \ldots, b_{S,t}^{(b)}]$ instead of $[b_{S,t}^{(1)}]$.

At the end of receiving the block $B^e$, all of the switches of the DDU are switched and the procedure described for the first block is repeated, but taking into consideration $\underline{b}_{S,t}^{(B)}=[b_{S,t}^{(1)}, b_{S,t}^{(2)}, \ldots, b_{S,t}^{(B)}]$ instead of $[b_{S,t}^{(1)}]$.

Figure 8:
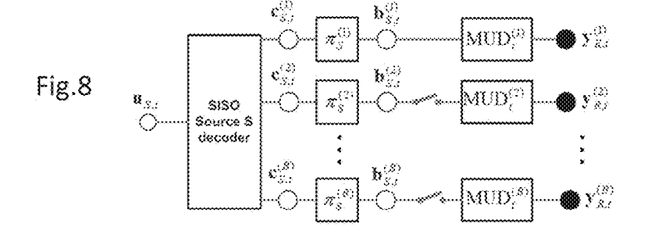
FIG. 8 is in the form of a factor graph showing the iterative structure of the DDU used for decoding the source S during the time slots $t \in \{1, \ldots, T\}$.

FIG. 8 shows the principle of multiuser detection and of joint decoding, in the form of a factor graph. The variable nodes are represented by circles and the constraint nodes by squares, with a constraint node being a function of the variable nodes that are attached thereto. Thus, the constraint node $\pi_S^{(b)}$ represents the constraint function $f(b_{S,t}^{(b)}, c_{S,t}^{(b)})$ that requires $b_{S,t}^{(b)}$ and $c_{S,t}^{(b)}$ to be linked by the interleaver $\pi_S^{(b)}$, i.e. $b_{S,t}^{(b)}=\pi_S^{(B)}c_{S,t}^{(b)}$ or $c_{S,t}^{(b)}=[\pi_S^{(b)}]^{-1} b_{S,t}^{(b)}$. The constraint node $MUD_t^{(b)}$ is linked to the variable nodes $b_{S_1,t}^{(b)}, \ldots, b_{S_M,t}^{(b)}$ and to the observation $t_{R,t}^{(b)}$. Since we are paying attention to the variable node $u_{S,t}$, only the variable node $b_{S,t}^{(b)}$ is shown. The rules of the "sum-product algorithm" [1] enable beliefs to be calculated from a constraint node to a variable node by taking account of the incident beliefs of the other variable nodes; this corresponds to activating multiuser detection for the constraint node $MUD_t^{(b)}$ or to activating decoding for the "SISO source S decoder" constraint node as shown in FIG. 7. Thus, in this example, the beliefs or probability messages (for each bit) are the extrinsic information in the form of extrinsic log likelihood ratios (LLRs).

Thus, during time slot t and block b, processing runs as follows. For each source $S \in \{S_1, \ldots, S_M\}$, the DDU runs the following steps:

1. If the $MUD_t^{(l)}$ l=1, ..., b are activated, they generate their beliefs concerning the values of the variable nodes $\underline{b}_{S,t}^{(b)}$ (these beliefs are generally in the form of vectors of LLR values).

2. The beliefs concerning $\underline{b}_{S,t}^{(b)}$ are converted into beliefs concerning $\underline{c}_{S,t}^{(b)}=[c_{S,t}^{(1)}, c_{S,t}^{(2)}, \ldots, c_{S,t}^{(b)}]$ by the deinterleavers $[\pi_S^{(l)}]^{-1}$ l=1, ..., b.

3. The beliefs concerning $\underline{c}_{S,t}^{(b)}$ are passed to the SISO channel decoder of the source S. In return, it generates its belief concerning the variable nodes $u_{S,t}$ and $\underline{c}_{S,t}^{(b)}$.

4. The beliefs concerning $u_{S,t}$ are passed to the DU.

5. If the DU allows the DDU to continue, then the belief concerning $\underline{c}_{S,t}^{(b)}$ is converted into belief concerning $\underline{b}_{S,t}^{(b)}$ by the interleaver $\pi_S^{(l)}$ l=1, . . . , b.

6. The beliefs concerning $\underline{b}_{S,t}^{(b)}$ are passed to the MUD$_t^{(l)}$ l=1, . . . , b.

7. Repeat steps 1 to 6.

Step 3 of detecting messages that have been decoded without error and of the relay taking a decision is performed by the DU. During each time slot t=1, . . . , T, step 3 detects errors in the estimated messages $\hat{u}_{S_1,t}$, $\hat{u}_{S_2,t}$, . . . , $\hat{u}_{S_M,t}$ at the end of each sub slot b ∈{1, 2, . . . , B}. In an implementation, error detection is performed by making use of CRC type information included in the first of the B blocks coming from the sources.

After each received block, encoding and transmission are controlled as follows:

1. In the absence of any message that has been decoded without error, the DU uses a selection scheme to decide which messages decoded during the preceding time slots need to be helped. For example, it is possible to help only the last message that has been decoded correctly, or by way of example it is possible to help any set of messages that have been decoded without error.

2. If some sources have been decoded without error, the unit allows help for these sources, i.e. it allows the ETU to encode and transmit for these sources.

3. If all of the sources are decoded without error, the DU causes the ETU to help all of the sources to the end of the current time slot, i.e. the error detection and decision step allows the messages from all of the sources to be encoded and transmitted up to the end of the current time slot. In an implementation, the DU causes the DDU to stop processing the received signals, i.e. the error detection and decision step prevents decoding until the end of the current time slot.

The selection scheme is adapted as a function of the storage capacity of the relay, and a function of the size of the sliding window when a sliding window is used by the destination, and as a function of the quantity of additional signalling needed for the destination. Among the various possible selection schemes, it is possible to distinguish the following two extreme schemes.

A first scheme in which help is allowed for any set of messages from any sources that have been correctly decoded during the preceding time slots (the messages that satisfy $\hat{u}_{S,i}=u_{S,i}$ for every i=1, . . . , t−1 and for every source ∈{$S_1$, . . . , $S_M$}). This set is taken at the input to the network coding (at a given time slot and a given sub slot, the relay information may be a function of any message transmitted by the sources). This scheme is compatible with so-called "backward" decoding at the destination providing a sliding decoding window is used that is of size Q=T.

A second scheme in which help may be given only to messages that have been decoded without error previously during the same time slot. Compared with the preceding scheme, this scheme requires a minimum of signalling. Storage size is small: at most MK bits. This scheme is compatible with decoding at the destination using a sliding decoding window that is of size Q=1.

Step 4 of encoding and transmission to the destination is performed by the encoding and transmission unit ETU shown in FIG. 9. This encoding and transmission step encodes the messages that have been decoded without error in order to transmit a signal that is representative only of those messages that have been decoded without error. The relay encodes jointly only those messages that have been decoded without error and it adds its own redundancy so as to create a network code.

This encoding and transmission step is under the control of the error detection and decision taking step that optionally allows encoding and that selects the sources to which help is to be given.

Figure 10:
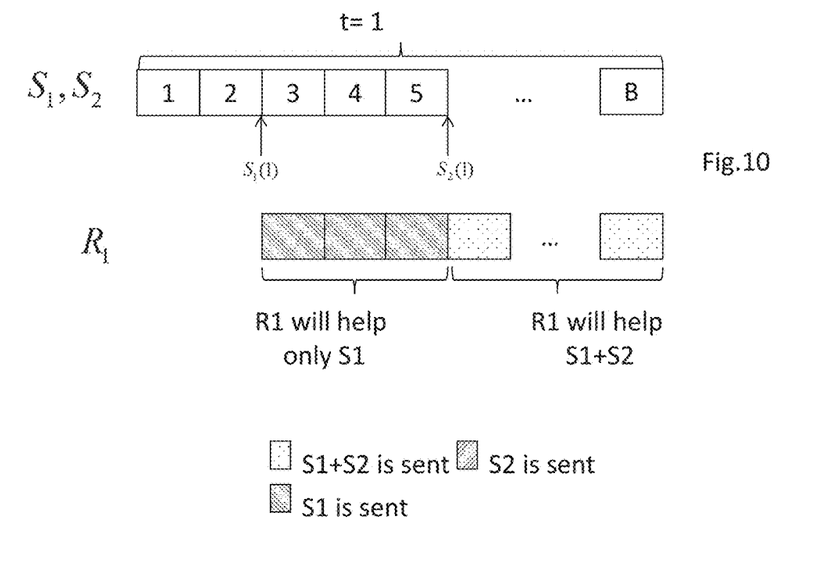
FIG. 10 shows an example of cooperation by the relay $R_1$ of a MARC system having two sources $S_1$ and $S_2$ when there is only one time slot subdivided into B sub slots.

FIG. 10 shows the B sub slots of the first time slot. Each sub slot b corresponds to a data block b. The figure shows an example of selection when T=1. In this selection, the relay detects the source message $S_1$ without error at the end of the second sub slot and it detects the source message $S_2$ without error at the end of the fifth sub slot. Given that the relay is a full-duplex relay, it can provide help to the source $S_1$ during the sub slots b=3, 4, 5 (it thus being understood that it can transmit a representative signal) while simultaneously continuing to listen (i.e. to receive). At the end of the fifth sub slot, the relay stops listening since it has correctly decoded all of the messages from the sources and it provides help to both sources by transmitting a signal resulting from network coding of the messages from $S_1$ and $S_2$.

Figure 11:
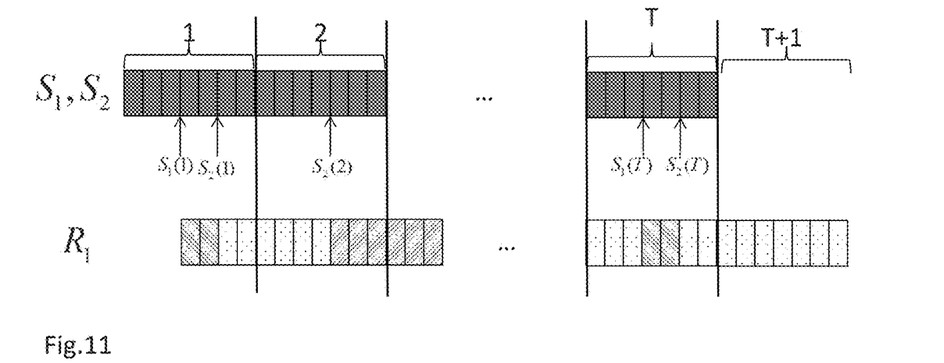
FIGS. 11 and 12 show examples of cooperation by the relay $R_1$ of a MARC system having two sources $S_1$ and $S_2$ during the time slots $t \in \{1, \ldots, T\}$, each being subdivided into B sub slots.
Figure 12:
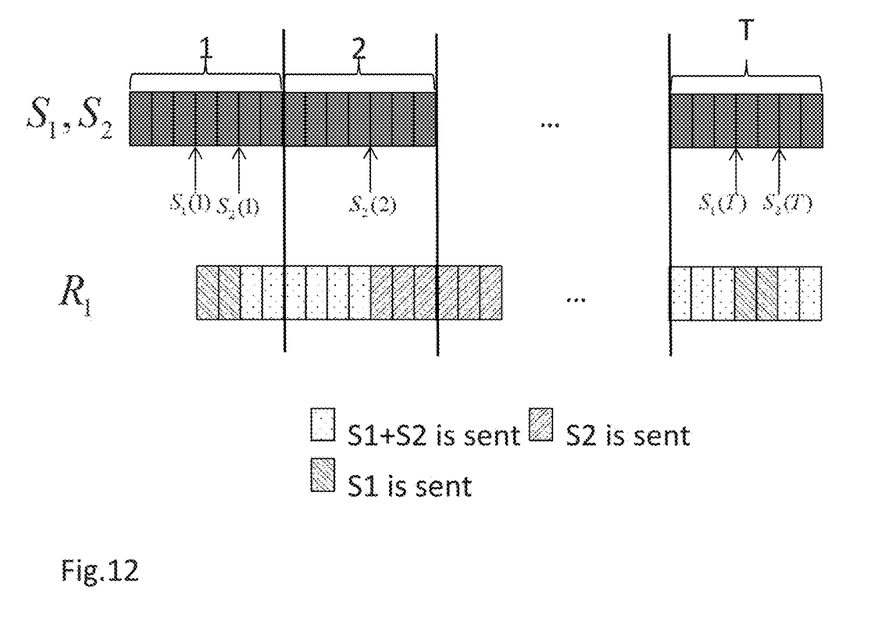

FIG. 11 shows an example of selection when t=1, . . . , T. During the first time slot t=1, the relay is capable of decoding without error $S_1$ and then $S_2$ at the end of the sub slots 3 and 5 respectively. During the time slot t=2 the relay is capable of decoding without error the message from $S_2$ at the end of sub slot 4. Under such circumstances, during the sub slots 1, 2, 3, and 4 of the time slot t=2, the relay continues to provide help to the messages from $S_1$ and $S_2$ of the first time slot. As from sub slot 5 of time slot t=2, the relay begins to provide help for the message from $S_2$ of the second time slot until a new message is correctly decoded, and so on. The selection scheme of FIG. 12 is identical to the scheme of FIG. 11 except that the relay does not transmit any more after time slot t=T. Thus, the protocol of the invention makes it possible to save a time slot compared with the prior art by giving help immediately to the message that has been decoded without error, without waiting for the end of time slot t=T. The protocol is thus more efficient concerning channel occupancy and thus transmission capacity.

During each time slot t ∈{1, . . . , T} and at the end of each sub slot b ∈{1, . . . , B}, as a general rule the unit DU orders the unit ETU to transmit a new signal generated from a new set $J_{R,t}^b$ of source messages that have been decoded without error during different time slots. At the input of the network encoder, the relay interleaves each message of this set $J_{R,t}^b$ by a distinct interleaver $\pi_{R,t,|J_{R,t}^b|}^b$ between the blocks b and between the messages of the set $J_{R,t}^b$.

By way of example, the network encoder is an exclusive OR on the interleaved messages $u'_{J_{R,t}^b(|J_{R,t}^b|)}$. The output from the network encoder is a message having K information bits, written $u_{R,t}^b \in F_2^K$. The message $u_{R,t}^b$ is interleaved by an interleaver written $\psi_{R,t}^b$. The interleaved message, written $\tilde{u}_{R,t}^b$ is converted by a channel encoder followed by a function for selecting bits in a sequence $c_{r,t}^b \in F_2^{n_r}$ from $n_R$ bits. The sequence $c_{R,t}^b$ is interleaved by a distinct interleaver written $\Pi_{R,t}^b$ and then modulated to obtain the complex sequence $x_{R,t}^b \in X^{N_b}$ in which X ⊂ C represents a complex signal of cardinal number |X|=$2^{q_R}$.

At the end of the time slots, the destination attempts to extract the messages from each source and from the relay. The sequence received during time slot t ∈{1, . . . , T} and during block b ∈{1, 2, . . . , B} is as follows:

$$y_{D,t}^{(b)} = \sum_{i=1}^{M} h_{S_i,D,t} x_{S_i,t}^{(b)} + h_{R,D,t} x_{R,t}^{(b)} 1_{\{J_{R,t}^b \neq \phi\}} + n_{D,t}^{(b)}$$

in which $h_{S_i,D,t} \in C$ represents the channel gain between the source $S_i$ and the destination D, $h_{R,D,t} \in C$ represents the channel gain between the relay R and the destination D, $n_{D,t}^{(b)} \in C^{N_b}$ is a noise vector, and $1_{\{J_{R,t}^b = \phi\}}$ is an indicator to indicate whether or not the relay is silent:

$$1_{\{J_{R,t}^b \neq \phi\}} = \begin{cases} 1 & \text{if } J_{R,t}^b \neq \phi \\ 0 & \text{else} \end{cases}$$

where $\phi$ represents the empty set.

The destination may use "sliding window" decoding, or it may use "backward" decoding.

When using a sliding window of length Q, $Q \in \{1, \ldots, T\}$, the destination begins at the end of each time slot $t \in \{Q, \ldots, T\}$ to decode messages from the sources in order to extract the QK information bits from each source that are transmitted during the time slots t, t−1, ..., t−(Q−1) with help from the message from the relay as transmitted during the time slots t, t−1, ..., t−(Q−1).

The size of the sliding window may be set at a maximum value, and the destination can decide on the optimum value on the basis of the signalling coming from the relay. For example, if the maximum size is three and if the destination knows that the relay does not give help to any source during the first time slot in the absence of messages that have been decoded without error, then the destination can begin to decode the first time slot immediately without waiting for three time slots.

The size of the sliding window at the destination can have an impact on the selection scheme of the relay. During a given time slot t, the selection scheme may be such that the relay does not give help to the messages that have been decoded without error in the time slots preceding the time slot t−(Q−1), i.e. the messages decoded during the time slots $\in \{1, \ldots, t-Q\}$.

Figure 13:
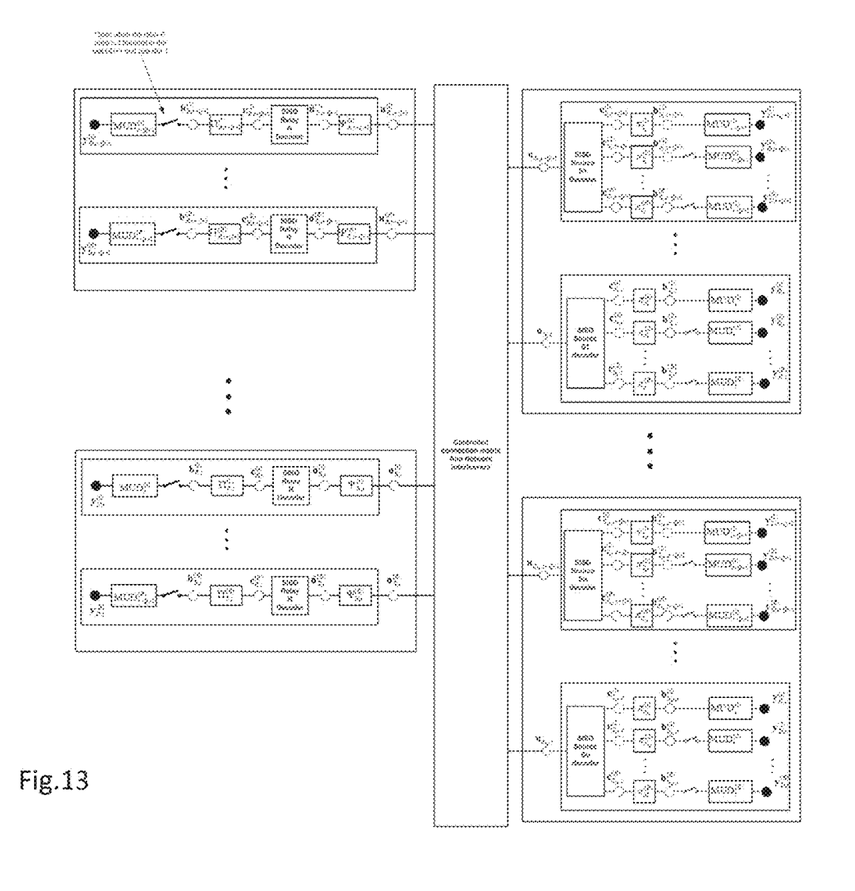
FIG. 13 is in the form of a factor graph showing the iterative structure of the destination decoder used for decoding the sources $S_1$ to $S_M$ during the time slots from $t-Q+1$ to $t$.

FIG. 13 shows the structure of the decoder at the destination in the form of a factor graph during the sliding window Q that covers all of the time slots from t−(Q−1) to t. Thus, for each time slot covered by the window, the detection and decoding systems of the sub blocks b, b=1, ... B, received from the sources are activated in succession, e.g. by operating switches to make the systems active. And, for each time slot covered by the window, the systems for decoding sequences received from the relay are activated, e.g. by operating switches in order to make the systems active as a function of signalling information giving each sub slot, i.e. each block, an indication as to whether or not it has been transmitted by the relay. All of the blocks and messages received during the window Q are decoded jointly. The controlled connection matrix and network interleavers sub unit makes connections between the variable nodes that represent the messages from the sources and the variable nodes that represent the sequences generated by the relay at each sub slot of each time slot. As input, this sub unit receives signalling information coming from the relay indicating for each sub slot the selection scheme used by the relay. The beliefs in the form of LLRs about the various variable nodes are exchanged within the factor graph until achieving convergence.

When implementing so-called "backward" decoding, the destination attempts to decode the messages from the sources at the end of time slot t=T, in order to extract the TK information bits from each source. This decoding scenario is appropriate when the T messages from a source form a frame (or super message), which means that there is no point in decoding one message before decoding the other messages. In contrast, when the messages from a source are independent, this scenario gives rise to pointless latency by necessarily waiting for the end of the time slot t=T. An example of the structure of the decoder is shown in FIG. 13. It is easy to obtain the "backward" decoding situation by setting t=T and Q=T. The constraint node $\text{MUD}_t^{(b)}$ is linked to the variable nodes $b_{S_1,t}^{(b)}, \ldots, b_{S_M,t}^{(b)}, b_{R,t}^{(b)}$ and to the observation $y_{D,t}^{(b)}$. For reasons of clarity, we have duplicated the constraint node $\text{MUD}_t^{(b)}$ for each variable node. Nevertheless, a single activation of detecting multiple users associated with the constraint node $\text{MUD}_t^b$ makes it possible to generate the beliefs (or extrinsic LLRs) to all of the associated variable nodes by taking account of the observation $y_{D,t}^{(b)}$ and the incident beliefs.

The decoder of FIG. 13 may be run as follows.

Step 1, all of the multiuser detectors MUD are activated as a function of the received signal:

$$y_{D,t-(Q-1)}^{(1)}, \ldots, y_{D,t-(Q-1)}^{(B)}, \ldots, y_{D,t}^{(1)}, \ldots, y_{D,t}^{(B)}.$$

Step 2, the variable nodes representing the network coded messages coming from the relay receive the beliefs about their values by activating their interleavers and corresponding SISO modules.

Step 3, the variable nodes representing the messages from the sources receive the beliefs about their values by activating firstly their interleavers and corresponding SISOs, and secondly the controlled connection matrix and network interleavers sub unit.

Step 4, on the basis of the beliefs received from the variable nodes of the messages from the sources, the destination verifies whether the messages have or have not been correctly decoded. If they have $u_{S_1,t-(Q-1)}, u_{S_2,t-(Q-1)} \ldots, u_{S_M,t-(Q-1)}$ been correctly decoded, the destination stops decoding iterations on this sliding window and slides the window to the following window (from t−(Q−1)+1 to t+1). Otherwise, the method moves on to step 5.

Step 5, the variable nodes representing the network coded messages from the relay receive the beliefs about their values from the controlled connection matrix and network interleavers sub unit.

Step 6, the multiuser detectors MUD receive the beliefs about the bits forming the modulated signals $y_{D,t-(Q-1)}^{(1)}, \ldots, y_{D,t-(Q-1)}^{(B)}, \ldots, y_{D,t}^{(1)}, \ldots, y_{D,t}^{(B)}$; these being obtained as from activation of the interleavers and SISO units associated with the network coded messages and with the messages from the sources.

Steps 1 to 6 are repeated until reaching a maximum number of iterations or until leaving the loop during step 4.

It should be observed that a plurality of messages at time slots other than t−(Q−1) can be decoded without error. These are used for simplifying decoding for the next decoding windows.

The number of decoding windows used governs the complexity of the receiver, so in certain applications it is possible for priority to be given to only a few decoding windows.

The destination may form part of a plurality of MARC systems that share the same sources and the same destination, but that have different relays, these relays using mutually different radio resources.

In the presence of second relays R', the constraint node $\text{MUD}_t^{(b)}$ is linked to the variable nodes $b_{S_1,t}^{(b)}, \ldots, b_{S_M,t}^{(b)}, b_{R,t}^{(b)}, b_{R',t}^{(b)}$ and to the observation $y_{D,t}^{(b)}$. As a result, the left-hand portion of FIG. 13 is duplicated, replacing R with R'. Activating the detection of multiple users associated with the constraint node $MUD_t^{(b)}$ makes it possible to generate the beliefs (or extrinsic LLRs) to all of the associated variable nodes $b_{S_1,t}^{(b)}, \ldots, b_{S_M,t}^{(b)}, b_{R,t}^{(b)}, b_{R',t}^{(b)}$ by taking account of the observation $y_{D,t}^{(b)}$ and the incident beliefs.

By way of example, the sources are users who seek to transmit messages to a common destination, e.g. a base station of a mobile access network. The sources are helped by a relay, which may be a cut-down base station, or for example one of the sources, when that source lies on the path between the sources and the base station. The sources may equally well be base stations addressing the same destination.

In a particular use, the two sources correspond to two mobile terminals. In another use, the two sources may correspond to two different services that are accessible from a single terminal, but under such circumstances the terminal is provided with at least two antennas that determine two different propagation channels between the terminal and the relay, and between the terminal and the destination.

APPENDIX

LLR: "Log Likelihood Ratio"
for U being a random binary variable, its log likelihood ratio (LLR) is defined by the following relationship:

$$LLR_u = \log\left(\frac{P_U(u=1)}{P_U(u=0)}\right)$$

in which relationship $P_U(u)$ denotes the probability that the random variable U takes the value u.

LAPPR: "Log A Posteriori Probability Ratio"
Represents to the LLR conditional on an observation that generally corresponds to a received signal.

$$LAPPR_u = \log\left(\frac{P(u=1\mid y)}{P(u=0\mid y)}\right)$$

[1] F. R. Kschischang, B. J. Frey, and H.-A. Loeliger, "Factor graphs and the sum-product algorithm," *IEEE Trans. Inform. Theory*, vol. IT-47, no. 2, pp. 498-519, February 2001.

The invention claimed is:

1. A relaying method performed by a full-duplex relay for a telecommunications system comprising a plurality of sources, the full-duplex relay, and a destination, the method comprising:
   a decoding process comprising estimating for each source a code word $x_{S,t}$ from received blocks corresponding to successive code words $x_{S,t}$ transmitted simultaneously by the plurality of sources during T time slots, such that, at each time slot t, t=1, ..., T, the code word $x_{S,t}$ comprises B blocks $x_{S,t}^{(1)}, x_{S,t}^{(2)}, \ldots, x_{S,t}^{(B)}$, a first block of the B blocks to be decoded independently of the other blocks, a code word $x_{S,t}$ encoding a K-bit message $u_{S,t}$, where K, B, and T are natural integers, B>2, T>1;
   detecting, by the full-duplex relay, messages that have been decoded without error and taking a decision; and
   encoding a signal and transmitting it to the destination, wherein the signal is representative only of messages that have been decoded without error;
   wherein, after each received block, the encoding and transmission are performed under the control of the process of detecting messages that have been decoded without error and of taking a decision in compliance with a selection scheme, and wherein the selection scheme is such that a representative signal relating to a message that has been decoded without error during a time slot is transmitted by the full-duplex relay during the same time slot.

2. A method according to claim 1, further comprising storing messages that have been decoded without error.

3. A method according to claim 1, wherein in the absence of a message that has been decoded without error during a current time slot t, the error detection and decision taking process allows a message that has been decoded without error during a preceding time slot to be encoded and transmitted.

4. A method according to claim 1, wherein the decision allows a message to be encoded and transmitted as soon as it has been decoded without error.

5. A method according to claim 1, wherein after each received block, detection and decoding are under the control of the process of detecting messages that have been decoded without error and of taking a decision in compliance with a selection scheme.

6. A method according to the claim 5, wherein if all the messages are decoded without error during a current time slot t, then the process of detecting messages that have been decoded without error and of taking decisions stops detection and decoding until the end of the current time slot and allows encoding and transmission.

7. A method according to claim 1, wherein the selection scheme is such that, at each current time slot t, the transmitted signal is representative of the messages decoded without error up to the current time slot t.

8. A method according to claim 1, wherein the selection scheme is such that, during each current time slot t, the transmitted signal is representative of the messages that have been decoded without error solely during the current time slot t.

9. A method according to claim 1, wherein the encoding and transmission process comprises interleaving for each source for which a message has been decoded without error prior to network coding.

10. A method according to claim 1, wherein the encoding and transmission process comprises network coding followed by first interleaving, by channel coding, and by second interleaving distinct from the first.

11. A full-duplex relay for a telecommunications system comprising a plurality of sources, the full-duplex relay, and a destination, the full-duplex relay comprising:
   a decoder configured to estimate for each source a code word $x_{S,t}$ from received blocks corresponding to successive code words $x_{S,t}$ transmitted simultaneously by the plurality of sources during T time slots, such that, at each time slot t, t=1, ..., T, the code word $x_{S,t}$ comprises B blocks $x_{S,t}^{(1)}, x_{S,t}^{(2)}, \ldots, x_{S,t}^{(B)}$, a first block of the B blocks to be decoded independently of the other blocks, a code word $x_{S,t}$ encoding a K-bit message $u_{S,t}$, where K, B, and T are natural integers, B>2, B>2;
   a decision component configured to enable the full-duplex relay to detect messages that have been decoded without error and to take a decision; and
   an encoder and transmitter configured to encode a signal and transmit it to the destination, wherein the signal is representative only of messages that have been decoded without error;

wherein the full-duplex relay is configured such that, after each received block, the encoder and transmitter is under the control of the decision component which detects messages that have been decoded without error and which takes a decision in compliance with a selection scheme, and wherein the selection scheme is such that a representative signal relating to a message that has been decoded without error during a time slot is transmitted by the full-duplex relay during the same time slot.

12. A reception method for a receiver of at least one MARC system for performing a relaying method according to claim 1, wherein the method comprises:
   jointly detecting and decoding blocks coming from the sources and of messages coming from the full-duplex relay, the detection and decoding being performed iteratively at the end of each time slot t such that $t \in \{Q, \ldots, T\}$ over the duration of a sliding window of length $Q$, $Q \in \{1, \ldots, T\}$, with propagation of probabilities between the iterations in order to estimate Q messages for each source;
   wherein the decoding of the messages from the full-duplex relay is configured in each sub slot on the basis of signalling information coming from the full-duplex relay indicating whether the full-duplex relay is cooperating on this block b, b=1, ... B; and
   wherein the propagation of probabilities is configured for each block b, b=1, ... B, on the basis of signalling information coming from the full-duplex relay indicating the selection scheme of the full-duplex relay, with B and T being natural integers, B>2, T>1.

13. A receiver for at least one multiple-access relay channel (MARC) system, said receiver comprising:
   a detector and decoder configured to jointly detect and decode blocks coming from a plurality of sources and messages coming from a relay, the detection and decoding being performed iteratively at the end of each time slot t such that $t \in \{Q, \ldots, T\}$ over the duration of a sliding window of length $Q$, $Q \in \{1, \ldots, T\}$, with propagation of probabilities between the iterations in order to estimate Q messages for each source of the plurality of sources;
   wherein the receiver is configured such that the decoding of the messages from the relay is configured in each sub slot on the basis of signalling information coming from the relay indicating whether the relay is cooperating on this block b, b=1, ... B; and
   such that the propagation of probabilities is configured for each block b, b=1, ... B, on the basis of signaling information coming from the relay indicating the selection scheme of the relay, with B and T being natural integers, B>2, T>1.

14. A method of transmitting a digital signal for a telecommunications system comprising a plurality of sources, a relay, and a destination implementing a spatially distributed network code, the method comprising for each source:
   encoding messages $u_{S,t}$ including respective CRCs into code words $c_{s,t}$; and
   transmitting the code words $c_{s,t}$ during T time slots to the relay and to the destination;
   wherein the encoding is of finite incremental redundancy type and, at each sub slot b=1, 2, ... , B of a time slot, it delivers a block $c_{S,t}^{(b)}$ such that the B successive blocks $\{c_{S,t}^{(b)}: 1 \leq b \leq B\}$ form a code word $c_{s,t}$ of the code words, a first block of the B blocks to be decoded independently of the other blocks, such that the following blocks are parity bits that add redundancy to the first block, with B and T natural integers, B>2, T>1.

15. A transmitter of a digital signal for a telecommunications system having a plurality of sources, a relay, and a destination implementing a spatially distributed network code, comprising:
   an encoder which encodes messages $u_{S,t}$ having respective CRCs into code words $c_{s,t}$; and
   a transmitter which transmits the code words $c_{s,t}$ during T time slots to the relay and to the destination;
   wherein the encoder is of finite incremental redundancy type and, at each sub slot b=1, 2, ... B of a time slot, it delivers a block $c_{S,t}^{(b)}$ such that the B successive blocks $\{c_{S,t}^{(b)}: 1 \leq b \leq B\}$ form a code word $c_{s,t}$ of the code words, a first block of the B blocks to be decoded independently of the other blocks, such that the following blocks are parity bits that add redundancy to the first block, with B and T natural integers, B>2, T>1.

* * * * *